(12) United States Patent
Ninet et al.

(10) Patent No.: US 12,484,557 B2
(45) Date of Patent: Dec. 2, 2025

(54) CONNECTED HATCHERY COMPRISING A PLURALITY OF DEVICES FOR HANDLING, PROCESSING OR VACCINATING EGGS OR CHICKS

(71) Applicant: Ceva Santé Animale S.A., Libourne (FR)

(72) Inventors: Olivier Ninet, Libourne (FR); William Boyer, Libourne (FR); Stéphane Veyrent, Libourne (FR); Carlos Gonzalez, Libourne (FR)

(73) Assignee: CEVA SANTE ANIMALE, Libourne (FR)

( * ) Notice: Subject to any disclaimer, the term of this patent is extended or adjusted under 35 U.S.C. 154(b) by 197 days.

(21) Appl. No.: 18/275,990

(22) PCT Filed: Feb. 7, 2022

(86) PCT No.: PCT/EP2022/052863
§ 371 (c)(1),
(2) Date: Aug. 30, 2023

(87) PCT Pub. No.: WO2022/167648
PCT Pub. Date: Aug. 11, 2022

(65) Prior Publication Data
US 2024/0099275 A1    Mar. 28, 2024

(30) Foreign Application Priority Data
Feb. 8, 2021   (EP) .................................. 21155835

(51) Int. Cl.
*A01K 45/00*   (2006.01)
*A01K 43/00*   (2006.01)

(52) U.S. Cl.
CPC ............ *A01K 45/007* (2013.01); *A01K 43/00* (2013.01)

(58) Field of Classification Search
CPC .......................... A01K 45/007; A01K 43/00
(Continued)

(56) References Cited

U.S. PATENT DOCUMENTS 10,827,726 B2 * 11/2020 Rosales ................. A01K 31/16
2002/0157613 A1 * 10/2002 Phelps ................. G01N 33/085
119/6.8

(Continued)

FOREIGN PATENT DOCUMENTS

WO   2016123149 A1   8/2016

OTHER PUBLICATIONS

Astill, Jake, et al.; Smart poultry management: Smart sensors, big data, and the internet of things; 2020; Computer and Electronics in Agriculture; pp. 1-8 (Year: 2020).*

(Continued)

*Primary Examiner* — Kerri L Mcnally
(74) *Attorney, Agent, or Firm* — Wood, Phillips, Katz, Clark & Mortimer (57) ABSTRACT

The invention relates to a connected hatchery (1) comprising a plurality of devices (22, 23, 24, 25, 3, 42, 43, 44, 45, 46, 47, 5, 62, 63, 64) for handling, processing or vaccinating eggs or chicks distributed along a production line, each of the devices being an automated device fitted with a programmable logic controller (231, 431, 451, 641) capable of producing at least one data stream (F23a, F23b, F23c, F23d, F43a, F43b, F43c, F43d, F43e, F43f, F45a, F45b, F45c, F45d, F45e, F64a, F64b, F64c, F64d) relating to the performance or operations of the said automated device, characterized in that it comprises a data centralizing and processing unit (7) arranged to collect the data streams produced by the programmable logic controllers of said automated devices in order to determine at least one performance indicator (I1, I2, I3) of the production line from (Continued)

one or more of said collected data streams and in order to transmit said performance indicator over a telecommunications network to a remote terminal.

9 Claims, 2 Drawing Sheets

(58) Field of Classification Search
USPC .................................................. 340/573.3
See application file for complete search history.

(56) References Cited

U.S. PATENT DOCUMENTS

2015/0338838 A1* 11/2015 McKelvey ............. G05B 15/02
  700/17
2019/0159433 A1* 5/2019 Feinberg ................ G01N 22/00

OTHER PUBLICATIONS

Smart Poultry Management (Year: 2020).*

* cited by examiner

CONNECTED HATCHERY COMPRISING A PLURALITY OF DEVICES FOR HANDLING, PROCESSING OR VACCINATING EGGS OR CHICKS

FIELD OF THE INVENTION

The invention relates to the field of poultry production. More specifically, the invention relates to the collection and analysis of the data of poultry hatcheries.

BACKGROUND OF THE INVENTION

A poultry production line is based on the management of hundreds of thousands of animals since they arrive in a hatchery in the form of eggs until they leave the hatchery in the form of chicks, this management consisting of a succession of operations that can last up to three weeks. These operations are often influenced by a series of variables and fluctuating factors which may have an impact on operational efficiency. The commercial farming of animals, in particular, must take into account and attempt to control tens of variables to ensure the wellness of the animal throughout its growth phases. In the case of bird farming, where a hatchery is responsible for good embryonic development until hatching, effective control of different variables is essential for the good health and wellness of the animals.

In order to improve the wellness of animals in this bird farming production line, while allowing large-scale production, modern production lines use a series of equipment that carry out handling, processing or vaccination operations automatically.

Considering the scale of the production volumes and the rate of the production line, deviations in performance and therefore the parameters of the various items of equipment at each level of said production line can have an enormous impact both on the wellness of the poultry along the line and on the quality and the efficiency of the hatchery. It is thus necessary to be able to monitor, in real time, these parameters, in order to be able to carry out corrective actions on the production line if this proves to be necessary.

To this end, certain devices are fitted with sensors or a programmable logic controller capable of producing a data stream relating to the performance or operations carried out by such equipment, so as to be able to monitor this performance or these operations. However, given the number of equipment used in a bird farming production line and the number of parameters that can have an impact on this production line, this solution is not itself sufficient. Furthermore, it may be necessary to follow the raw data produced by the items of equipment as well as correlations between different types of data generated by the same equipment or by different equipment.

Thus, there is a need for a solution that makes it possible to monitor an entire bird farming production line, on the scale of a hatchery. The present invention lies in this context, and aims to meet this need.

BRIEF SUMMARY OF THE INVENTION

For these purposes, the invention relates to a connected hatchery comprising a plurality of devices for handling, processing or vaccinating eggs or chicks distributed along a production line, each of the devices being an automated device fitted with a programmable logic controller capable of producing at least one data stream relating to the performance or operations of the said automated device, characterized in that it comprises a data centralizing and processing unit arranged to collect the data streams produced by the programmable logic controllers of said automated devices in order to determine at least one performance indicator of the production line from one or more of said collected data streams and in order to transmit said performance indicator over a telecommunications network to a remote terminal.

By virtue of the invention, it is possible to collect, at the same centralization and processing unit, all of the data produced by the various pieces of equipment of the production line, in order to then determine in real time one or more performance indicators from one or more of these data. These indicators may consist of raw data or combinations of data making it possible to highlight certain correlations between these data. These indicators can thus give an indication as to whether the poultry is in a precise location of the production line or for the quantity of viable poultry produced at the outlet of the production line. Such indicator(s) can then be transmitted to a remote terminal, for example by being sent by the centralizing and processing unit to a remote computer server, which can then relay these indicators to a computer application installed on a smartphone of an operator responsible for controlling the production line. This operator thus has access in real time to these indicators, so as to be able to trigger, in the event of a deviation from one of these indicators, a corrective action to adjust one or more parameters of one or more equipment items of the production line.

In one embodiment of the invention, each device for handling, treating or vaccinating eggs or chicks is a device chosen from:
  a. A device for arranging eggs from a rack on a conveyor;
  b. A device for assessing the size and/or weight of one or more eggs, in particular moving on a conveyor;
  c. A device for detecting upside-down eggs, in particular moving on a conveyor, and marking said upside-down eggs;
  d. A device for filling a rack with eggs moving on a conveyor;
  e. A device for stacking racks on a carriage;
  f. An egg incubator or a hatchery;
  g. A device for detecting eggs that are unfertilized or contain a dead embryo, in particular moving on a conveyor, and if warranted, comprising a means for removing the unfertilized or dead-embryo-containing egg from said conveyor;
  h. A device for detecting the gender of the embryos in the egg (in ovo);
  i. A device for disinfecting eggs, in particular moving on a conveyor;
  j. A device for vaccinating embryos in eggs (in ovo), in particular ones moving on a conveyor;
  k. A device for cleaning a rack;
  l. A device for arranging chicks from a rack on a conveyor;
  m. A device for vaccinating chicks by injection, in particular ones moving on a conveyor;
  n. A device for sorting chicks by gender, in particular ones moving on a conveyor;
  o. A counter to count chicks moving on a conveyor;
  p. A device for vaccinating chicks by spraying, in particular ones moving on a conveyor.

In one embodiment of the invention, the connected hatchery may comprise:
  a. A zone for receiving eggs coming from one or more farms, the reception zone comprising one or more conveyors, a device for arranging eggs from a rack on one of these conveyors, a device for evaluating the size and/or the weight of the eggs moving on one of these conveyors, a device for the detection of upside-down eggs moving on one of these conveyors, and marking said upside-down eggs, a device for filling a rack with eggs moving on one of these conveyors, and a device for stacking racks on a carriage;

b. An incubator for receiving eggs from the egg receiving room and fitted with means for controlling the temperature and moisture within the incubator;

c. A zone for transferring incubated eggs to a hatcher, the transfer zone comprising one or more conveyors, a device for de-stacking trays filled with eggs from a cart on one of those conveyors, a device for detecting eggs that are unfertilized or that contain a dead embryo moving on one of these conveyors and removing said unfertilized dead-embryo-containing egg from said conveyor, a device for disinfecting eggs moving on one of these conveyors, a device for vaccinating one or more eggs moving on one of the conveyors by injection, a device for filling a rack with eggs moving on one of these conveyors, and a device for stacking racks on a carriage;

d. A hatcher for receiving eggs from the egg transfer zone and fitted with means for regulating temperature and moisture within the hatcher;

e. A departure area of chicks coming from the hatcher, the transfer area comprising one or more conveyors, a device for de-stacking racks filled with chicks from a carriage onto one of these conveyors, a device for vaccinating, by injection, chicks moving on one of these conveyors, a counter of chicks moving on one of these conveyors and arranged to fill a basket with a predetermined number of chicks, a device for vaccinating, by spraying, chicks moving on one of these conveyors;

f. A rack washing zone fitted with a device for disinfecting and cleaning a rack.

Advantageously, the device for arranging eggs from a rack onto a conveyor can be fitted with handling means, for example comprising a plurality of actuators and suction cups, controlled automatically by a programmable logic controller to handle and transfer each an egg stored in a rack to a conveyor. If necessary, said programmable logic controller can be arranged to produce one or more data streams relating to the number of racks handled since the device was put into service or since the operations of the device were reset, relating to the number of eggs in total or per rack transferred by the device to the conveyor since the device was put into service or since the operations of the device were reset, relating to the number of empty locations in total or per rack since the device was put into service or since the operations of the device were reset.

Advantageously, the device for evaluating the size and/or weight of one or more eggs moving on a conveyor may be fitted with means, in particular mechanical and/or optical means, measurements of the dimensions and/or weight of the egg, controlled automatically by a programmable logic controller. If necessary, said programmable logic controller can be arranged to produce one or more data streams relating to the weight or dimensions of each egg measured since the device was put into service or since the operations of the device were reset.

Advantageously, the device for detecting upside-down eggs moving on a conveyor, and marking said upside-down eggs moving can be fitted with means, in particular mechanical and/or optical means, for detecting the orientation of the eggs on the conveyor and means for marking the upside-down eggs, for example by means of ink, said detection means and said marking means being controlled automatically by a programmable logic controller. If necessary, said programmable logic controller can be arranged to produce one or more data streams relating to the number of eggs analyzed by the device, in total or per rack, since the device was put into service or since the operations of the device were reset, relating to the number of upside-down eggs, in total or per rack, since the device was put into service or since the operations of the device were reset, relating to the speed of analysis of the device since the device was put into service or since the operations of the device were reset, relating to an active or inactive state of an operational alarm of all or part of the device.

Advantageously, the egg incubator and/or hatcher may be fitted with means for measuring and controlling the temperature, the luminosity, the humidity, the concentration of a gas, for example carbon dioxide or dioxygen, within the incubator and/or hatcher, said measurement and control means being automatically controlled by a programmable logic controller. Where applicable, said programmable logic controller may be arranged to produce one or more data streams relating to the temperature, the humidity, the concentration of a gas within the incubator and/or from the hatcher since the incubator and/or hatcher was put into service or since the operations of the incubator and/or hatcher were reset.

Advantageously, the device for detecting an unfertilized egg or a dead embryo in an egg moving on a conveyor and removing said unfertilized egg from said conveyor is fitted with means, for example optical means, in particular provided with a laser emitter, detecting a physiological state of the egg and mechanical means for removing an unfertilized egg or one containing a dead embryo from the conveyor, for example means provided with a plurality of suction cups and actuators, said detection means and said mechanical removal means being automatically controlled by a programmable logic controller. If necessary, said programmable logic controller can be arranged to produce one or more data streams relating to the number of eggs analyzed by the device, in total or per rack, since the device was put into service or since the operations of the device were reset, relating to the number of fertilized and/or unfertilized eggs detected by the device, in total or per rack, since the device was put into service or since the operations of the device were reset, relating to the number of eggs containing a live and/or dead embryo detected by the device, in total or per rack, since the device was put into service or since the operations of the device were reset, relating to the number of eggs removed from the conveyor by the device, in total or per rack, since the device was put into service or since the operations of the device were reset, relating to the speed of analysis of the device since the device was put into service or since the operations of the device were reset, relating to an active or inactive state of an operating alarm for all or part of the device.

Advantageously, at least one or each device for vaccinating the eggs or chicks moving on a conveyor may be fitted with one or more vaccine containers, and means for injecting or spraying the vaccine, for example comprising a plurality of mechanical needles and actuators each able to introduce one of the needles into an egg or a chick and to inject the vaccine contained in the container into the egg or the chick via the needle, the containers and the injection or spraying means being automatically controlled by a programmable logic controller. If necessary, said programmable logic controller can be arranged to produce one or more data streams relating to the number of eggs or chicks vaccinated by the device, in total or per rack, since the device was put in service or since the operations of the device were reset, relating to the speed of vaccination of the device since the device was put in service or since the operations of the device were reset, relating to an active or inactive state of an operating alarm for all or part of the device, relating to the amount of vaccine remaining in the or each container.

Furthermore, the programmable logic controller of a vaccination device may generate a data stream specific to the vaccination method used by that device. For example, for an injection vaccination device, the programmable logic controller will be able to generate a data stream comprising the number of cycles between each maintenance, pressure, volume or weight of vaccine administered, the temperature of the vaccine, and the duration of full use of a vaccine container. For example, for a spray vaccination device, the programmable logic controller will be able to generate a data stream comprising the total number of cycles per session, the cycles before maintenance, the percentage of cycles that are correct, and the volume of vaccine administered.

Advantageously, the chick counter comprises one or more chick conveyors, one or more basket conveyors and means for distributing a predetermined number of chicks moving on the chick conveyor(s) in a basket moving on the basket conveyor(s), the conveyors and the distribution means being automatically controlled by a programmable logic controller. If necessary, said programmable logic controller may be arranged to produce one or more data streams relating to the number of baskets filled with chicks by the counter since the counter was put into service or since the operations of the counter were reset, relating to the number of chicks distributed by the counter, in total or per rack, since the counter was put into service or since the operations of the counter were reset, relating to the counter's speed of filling since the counter was put into service or since the operations of the counter were reset, relating to an active or inactive state of an operational alarm of all or part of the device.

Advantageously, the programmable logic controller of each automated device will be able to generate a data stream including time-stamp information comprising for example the start and end of the operations carried out by that device for a flock of eggs or chicks, identification information comprising for example the name of the operator in charge of the device, or an identifier of the flock and/or of the compartment and/or of the basket containing eggs or chicks treated by said device and/or of information relating to the environment or to the operation of the device.

Preferably, each device for handling, treating or vaccinating eggs or chicks may comprise a communication unit able to transmit said data stream produced by the programmable logic controller of said device to the centralizing and processing unit. For each automated device, said communication unit may be a wired communication unit connected by one or more cables to the centralizing and processing unit. As a variant, said communication unit may be a wireless communication unit able to transmit data frames according to a given communication protocol on a telecommunication network. For example, it may equally well be a Wi-Fi protocol, of the LTE (4G or 5G) type, of the Bluetooth type, of the Zigbee type or of the LoRaWan type.

Advantageously, at least two communication units of two distinct devices are able to transmit data frames according to two distinct communications protocols. If necessary, the centralizing and processing unit is arranged to determine the communication protocol used to transmit a data frame that it receives and to extract data from said data frame that it receives based on said determined communication protocol. For example, each automated device can be associated beforehand, for example during the installation of said automated device in the production line, with the centralizing and processing unit by identifying, in a memory of the centralizing and processing unit, the communication protocol used by the communication unit of that automated device and by associating that protocol with an identifier of said communication unit. During the transmission of a data frame by said communication unit, the communication unit can be arranged to transmit its identifier in the data frame so that the centralizing and processing unit can identify the communication unit that had transmitted a data frame that it receives and select in its memory said communication protocol associated with that identifier in order to then extract the data from that data frame.

Advantageously, the centralizing and processing unit is arranged to transmit said or each performance indicator over the telecommunication network according to a single communication protocol, for example according to an MQTT (Message Queuing Telemetry Transport) protocol.

In one embodiment of the invention, the communication unit of at least one of the devices for handling, processing or vaccinating eggs or chicks is incorporated into the programmable logic controller of said device. In one variant, the communication unit of at least one of the devices for handling, processing or vaccinating eggs or chicks is connected to the programmable logic controller of said device in order to read said data stream produced by that programmable logic controller.

Advantageously, the programmable logic controller of each automated device is arranged to automatically produce at least one data stream relating to the performance or operations of said automated device, each item of data of said data stream being automatically generated by the controller during the performance or operations of said automated device. For example, said programmable logic controller of a device may generate data of a data stream periodically. In one variant, said programmable logic controller of a device will be able to produce data of a data stream automatically in response to the detection by the device of a specific event, for example in response to the processing of a new egg, new chick, new basket or a new rack or new flock, or in response to the detection of a performance fault of the device, an error in an operation carried out or to be carried out by the device.

Alternatively or additionally, at least one of the automated devices may comprise an interface intended to be manipulated by an operator, such as a keyboard or a button, said programmable logic controller of a device being arranged to produce data of a data stream in response to the manipulation of the interface by the operator. Advantageously, said programmable logic controller of a device may be arranged to produce reset a data stream, and in particular a counter, in response to the operator's manipulation of the interface.

In one embodiment of the invention, the hatchery comprises at least one sensor capable of measuring an environmental parameter of the hatchery, the data centralizing and processing unit being arranged to collect the measurements of said environmental parameter acquired by said sensor. For example, each zone of the production line may comprise a sensor or a plurality of sensors of a local environmental parameter at that zone. It may in particular and equally well be one of several of the following sensors: a temperature sensor, a humidity sensor, a light sensor, a gas concentration sensor and in particular a carbon dioxide or molecular hydrogen sensor. Alternatively or in a cumulative manner, the hatchery comprises at least one sensor able to identify the identity of an operator or to control the access of an operator to a zone of the hatchery.

Preferably, the centralizing and processing unit is arranged to update said performance indicator of said production line upon receipt of a new item of data and to transmit said updated performance indicator on said telecommunication network to said remote terminal.

Advantageously, the centralizing and processing unit is arranged to determine said at least one performance indicator of said production line by means of a combination of at least two data from one or more collected data streams, and in particular by means of a combination of at least two data from one and the same data stream or from at least two distinct data streams. In particular, combination of data means one of the following operations or a combination of at least two of the following operations: a ratio between two data; a difference between two data, and in particular a difference between a current value and an initial value; a sum of several data, and in particular a sum of all the data of a data stream generated during a given period, the average of several data, the multiplication of two data. As a variant, the performance indicator may be determined by means of the resultant of a logical operation carried out on one or several data, or by means of the selection of one piece of data from a plurality of data, such as the selection of a maximum or minimum value or the selection of the first or the last data of a data stream. Also alternatively, the performance indicator may be formed directly by the raw data of a data stream. If necessary, the determination of more complex performance indicators, of the type of those described above, can be carried out by a remote computer server receiving these raw data, these more complex performance indicators then being transmitted by the remote server to the terminal.

By way of example, the performance indicator may be one of the following time indicators: A number of eggs or chicks handled, processed or vaccinated by a device of the production line; a percentage of upside-down eggs detected, a percentage of fertilized eggs, the number of chicks coming from the production line; an average rate of handling, processing, or vaccination of a device of the production line; the minimum, maximum or average temperature in a zone or part of the production line; the minimum, maximum or average humidity in a zone or part of the production line. If necessary, the performance indicator may be determined for a given period, for a given flock, or for a complete production cycle including several flocks.

Still by way of example, the performance indicator may be one of the following time indicators: an operating temperature of a motor of a device of the production line, a current consumption of a device of the production line, an air pressure of a pneumatic actuator of a device of the production line, the number of manipulations carried out by an actuator of a device of the production line.

The invention also relates to a method for producing a plurality of data streams by a plurality of devices for handling, processing or vaccinating eggs or chicks distributed along a production line of a hatchery, for collection of said data streams by a centralizing and processing unit, for determining at least one performance indicator of said production line from one or more of said collected data streams and for transmitting said performance indicator over a telecommunications network to a remote terminal.

DETAILED DESCRIPTION OF THE INVENTION

The present invention is now described with the aid of only illustrative and in no way limiting examples of the scope of the invention, and from the appended drawings, drawings in which the various figures represent.

In the following description, identical elements, by structure or function, appearing in different figures retain, unless otherwise specified, the same references.

Figure 1:
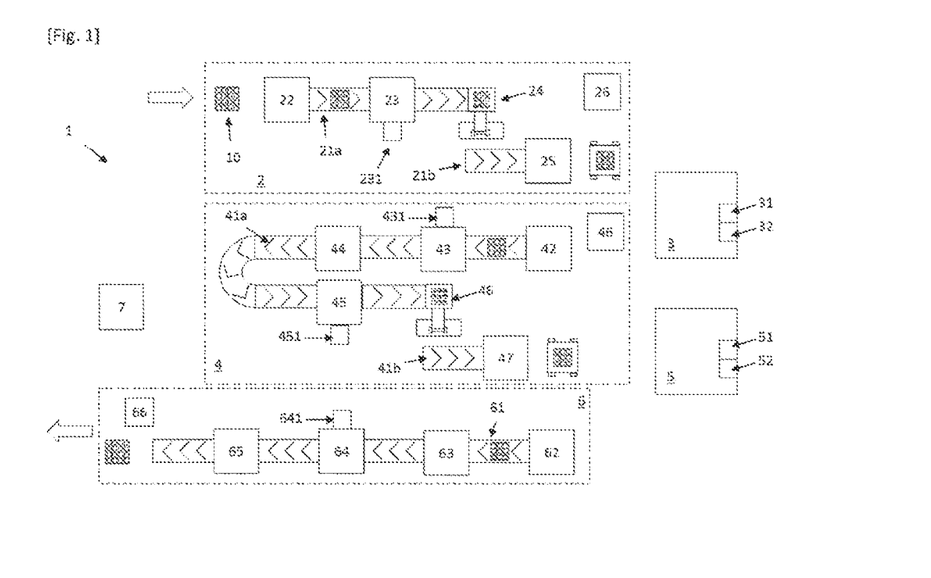
FIG. 1 represents, schematically and partially, a connected hatchery according to one embodiment of the invention.

In [FIG. 1] a connected hatchery 1 is shown according to one embodiment of the invention. The operation of the hatchery 1 through the production line will be described in a first step.

The hatchery 1 comprises a zone 2 for receiving eggs 10 coming from one or more farms. This receiving zone 2 defines a first part of the production line and comprises two conveyors 21a and 21b on which the eggs 10 circulate. Various automated devices are arranged along the first conveyor 21a of the zone 2, namely a device 22 for arranging eggs from a rack, a device 23 for detecting upside-down eggs and marking said upside-down eggs, a device 24 for transferring eggs from the first conveyor 21a to a rack arranged on the second conveyor 21b and a device 25 for stacking racks on a carriage.

A flock of eggs is thus carried from a farm to the receiving zone 1 and the eggs of this flock thus move in batches on the first conveyor to be measured therein before being transferred onto racks on the second conveyor, which are thus stacked on a carriage.

The carriage is then transferred into a second zone formed by an incubator 3 defining a second part of the production line. The incubator 3 is fitted with means 31 and 32 for regulating the temperature and moisture within the incubator 21. The eggs are thus stored in the incubator for a period of about 20 days, at the end of which the carriage is transferred to a transfer zone 4.

The transfer zone 4 defines a third part of the production line. It comprises two conveyors 41a and 41b. Various automated devices are arranged along the first conveyor 41a of the zone 4, namely a device 42 for de-stacking trays filled with eggs from the carriage onto that conveyor 41a, a device 43 for detecting unfertilized eggs or ones containing a dead embryo and removing said unfertilized eggs or dead-embryo-containing eggs from said conveyor 41a, an egg disinfecting device 44, a vaccination device 45 by injection of one or more vaccines into the eggs, a device 46 for transferring eggs from the first conveyor 41a to a rack arranged on the second conveyor 41b, and a device 47 for stacking racks on a carriage.

The eggs thus move on the first conveyor in order to be sorted, disinfected and vaccinated therein before being transferred onto racks on the second conveyor, which are thus stacked on a carriage.

The carriage is then transferred into a fourth zone formed by a hatcher defining a fourth part of the production line. The hatcher 5 is fitted with means 51 and 52 for regulating the temperature and moisture within the hatcher 5. The eggs are thus stored until the chicks hatch, for a period of a few days, at the end of which the carriage is transferred to a departure zone 6.

The departure zone 6 defines a fifth part of the production line. It comprises a conveyor 61, along which various automated devices are arranged, namely a device 62 for de-stacking trays filled with chicks from the carriage on the conveyor 61, a vaccination device 63 injecting vaccine into the chicks, a counter 64 of chicks moving on one of these conveyors and arranged to fill a basket with a predetermined number of chicks and a vaccination device 65 spraying vaccine onto the chicks arranged in the baskets.

The chicks thus circulate on the conveyor in order to be vaccinated, counted, and re-vaccinated therein before leaving the hatchery.

The example shown above is not limiting, it being understood that other arrangements, other areas and other types of machines could be envisaged without departing from the scope of the present invention.

The data streams produced by some of the devices mentioned above will now be described. For the purposes of simplicity, only some of these devices will be described, it being understood that the rest of the devices can also produce data streams.

The upside-down egg detection device 23 is fitted with means for detecting the orientation of the eggs on the conveyor 21a and means for marking the upside-down eggs, said detection means and said marking means being automatically controlled by a programmable logic controller 231. In the example described, the detection means comprise:
   a. a heating module comprising an infrared light source configured to expose a batch of eggs to infrared light and create a hot zone in an air cell of each egg,
   b. an imaging module with a thermal camera configured to capture thermal images of the batch of eggs,
   c. an analysis module configured to detect the presence of the hot zone in the air cell of each egg from the thermal images and identify the orientation of each egg of the batch of eggs.

The marking means comprise a plurality of buffers, each pad being mobile vertically and movable by means of an actuator for marking an egg of a batch of eggs, the programmable logic controller 231 being arranged to control each buffer as a function of the detections carried out by the analysis module.

The programmable logic controller 231 is thus arranged to produce a plurality of data streams, namely a data stream F23*a* relating to the number of eggs in the flock analyzed by the detection means and a data stream F23*b* relating to the number of upside-down eggs detected by the detection means. Each counter making it possible to generate these data streams is reset manually by an operator when the last batch of the flock has been analyzed or when a new flock is to be analyzed. Each counter is incremented by the number of eggs analyzed or detected when a batch was analyzed by the detection means, a new item of data of the streams F23*a* and F23*b* thus being produced, in the form of a numerical value, at the end of the analysis of a batch. The programmable logic controller 231 is also arranged to produce a data stream F23*c* relating to the analysis speed of the device 23, measured in numbers of eggs analyzed per hour, and determined from the number of eggs of the flock analyzed by the detection means during a sliding time window, for example during the last 10 minutes. A new item of data of stream F23*c* is thus produced periodically, in the form of a numerical value.

The programmable logic controller 231 is further arranged to produce a data stream F23*d* relating to an active or inactive state of an operational alarm of all or part of the device 23. A new item of data of the stream F23*d* is thus produced periodically in the form of a logic value, the logic value of this item of data being determined according to the state of the or each alarm.

The device 43 for detecting unfertilized eggs or ones containing a dead embryo and for removing said unfertilized eggs or containing a dead embryo of the conveyor 41*a*, also called examining device, is fitted with means for detecting a physiological state of the eggs and means for removing the unfertilized eggs or ones containing a dead embryo from that conveyor, said detection means and said mechanical removal means being automatically controlled by a programmable logic controller 431. In the example described, the detection means comprise:
   a. at least one row of coherent laser sources arranged transversely to the direction of advance of the conveyor to emit at least one laser beam toward each of the eggs of the same row of a batch of eggs,
   b. at least one row of photodiodes for receiving light fluxes from the eggs of a row of a batch of eggs,
   c. a module for computing the light flux received by each photodiode in order to determine the fertilized or unfertilized state of the egg from which that light flux originates or to determine whether the egg contains a living or dead embryo.

The removal means comprise a plurality of suction cups, each suction cup being mobile vertically and movable as well as actuatable by means of an actuator to remove an egg from a batch of eggs on the conveyor 41*a*, the programmable logic controller 431 being arranged to control each suction cup based on the detections of unfertilized eggs or containing a dead embryo operated by the processing module.

The programmable logic controller 431 is thus arranged to produce a plurality of data streams, namely a data stream F43*a* relating to the number of eggs in the flock analyzed by the detection means, a data stream F43*b* relating to the number of fertilized eggs and/or ones containing a dead embryo detected by the detection means, a data stream F43*c* relating to the number of unfertilized eggs and/or ones containing a dead embryo detected by the detection means and a data stream F43*d* relating to the number of eggs removed from the conveyor 41*a* by the removal means. Each counter making it possible to generate these data streams is reset manually by an operator when the last batch of the flock has been analyzed or when a new flock is to be analyzed. Each counter is incremented by the number of eggs analyzed, fertilized, unfertilized, containing a living embryo, containing a dead embryo, or removed, when a batch of eggs exits from the device 43, a new item of data of the streams F43*a* to F43*d* thus being produced, in the form of a numerical value, at this outlet of the batch. The programmable logic controller 431 is also arranged to produce a data stream F43*e* relating to the analysis speed of the device 43, measured in numbers of eggs analyzed per hour, and determined from the number of eggs of the flock analyzed by the detection means during a sliding time window, for example during the last 10 minutes. A new item of data of stream F43*e* is thus produced periodically, in the form of a numerical value.

The programmable logic controller 431 is further arranged to produce a data stream F43*f* relating to an active or inactive state of an operational alarm of all or part of the device 43. A new item of data of the stream F43*f* is thus produced periodically in the form of a logic value, the logic value of this item of data being determined according to the state of the or each alarm.

The vaccination device 45 injecting the vaccine into the eggs is fitted with a container of a vaccine fitted with a filling sensor of the container and means for injecting the vaccine contained in the container into eggs on the conveyor 41*a*, said sensor and said injection means being automatically controlled by a programmable logic controller 451. In the example described, the injection means of the vaccine comprise:
a. a plurality of injectors mounted on a support, each provided with a suction cup and a needle,
b. a main actuator configured to move the main support in a longitudinal direction,
c. a plurality of individual actuators each coupled to an injector and configured to move the injector in the longitudinal direction independently of the other actuators.

The logic controller 451 is thus arranged to produce a plurality of data streams, namely a data stream F45*a* relating to the number of eggs in the flock vaccinated by the vaccine injection means and a data stream F45*b* relating to the number of eggs vaccinated since a complete reset of the device. Each counter making it possible to generate these data streams is reset manually by an operator when the last batch of the flock has been analyzed or when a new flock is to be analyzed or when the device 45 is reset. Each counter is incremented by the number of eggs of a batch that were vaccinated, at the exit of a batch of eggs from the device 45, a new item of data of the flows F45*a* and F45*b* thus being produced, in the form of a numerical value, at this outlet of the batch. The programmable logic controller 451 is also arranged to produce a data stream F45*c* relating to the vaccination speed of the device 45, measured in numbers of eggs analyzed per hour, and determined from the number of eggs of the flock vaccinated by the injection means during a sliding time window, for example during the last 10 minutes. A new item of data of the stream F45*c* is thus produced periodically, in the form of a numerical value.

The programmable logic controller 451 is further arranged to produce a data stream F45*d* relating to an active or inactive state of an operational alarm of all or part of the device 45 as well as a data stream F45*e* relating to the filling level of the vaccine container. A new item of data of the stream F45*d* is thus produced periodically in the form of a logic value, the logic value of this item of data being determined according to the state of the or each alarm. A new item of data of the stream F45*e* is also produced periodically in the form of a logical value, the logic value of this item of data being determined as a function of the detection of a "low" filling state of the container or as a function of the detection of the installation of a new container.

The chick counter 64 comprises a basket conveyor and means for distributing a predetermined number of chicks moving on the conveyor 64 in a basket moving on the basket conveyor, the distribution means being fitted with a camera and means for processing images acquired by the camera arranged to count the number of chicks passing a virtual line in that image, the conveyors and the distribution means being automatically controlled by a programmable logic controller 641.

The programmable logic controller 641 is thus arranged to produce a plurality of data streams, namely a data stream F64*a* relating to the number of baskets filled with chicks from the flock by the distribution means and a data stream F64*b* relating to the number of chicks from the flock counted by the distribution means. Each counter making it possible to generate these data streams is reset manually by an operator when the last batch of the flock has been analyzed or when a new flock is to be analyzed. The counter used for the stream F64*a* is incremented each time a basket is filled while the meter used for the stream F64*b* is incremented each time a chick is counted, a new item of data of these streams F64*a* and F64*b* thus being produced, in the form of a numerical value, during these events. The programmable logic controller 641 is also arranged to produce a data stream F64*c* relating to the filling speed of the device 64, measured in numbers of chicks counted per hour, and reevaluated each time a new chick is counted. A new item of data of the flow F45*c* is thus produced, in the form of a numerical value, each time a new chick is counted.

The programmable logic controller 641 is further arranged to produce a data stream F64*d* relating to an active or inactive state of an operational alarm of all or part of the device 64. A new item of data of the stream F64*d* is thus produced periodically in the form of a logic value, the logic value of this item of data being determined according to the state of the or each alarm.

The programmable logic controller of each automated device may also be able to generate a data stream including information other than that which is described above, and particularly time-stamp information comprising for example the start and end of the operations carried out by that device for a flock of eggs or chicks, identification information comprising for example the name of the operator in charge of the device, or an identifier of the flock and/or of the compartment and/or of the basket containing eggs or chicks treated by said device and/or of information relating to the environment or to the operation of the device.

The hatchery 1 further comprises a set of sensors 26, 48 and 66, distributed in the zones 2, 4 and 6 and each able to measure the ambient temperature and ambient humidity in the zone wherein it is placed.

In order to be able to monitor the assembly of the production line of the hatchery 1, the hatchery 1 comprises a data centralizing and processing unit 7.

Each of the devices 23, 43, 45 and 64 comprises a communication unit able to transmit to the unit 7 each of the data streams F23*a* to F23*d*, F43*a* to F43*f*, F45*a* to F45*e* and F64*a* to F64*d*, produced by the programmable logic controller 231, 431, 451 and 641 of said device. In a non-limiting example, the communication unit of the devices 23, 43 and 45 is integrated into the programmable logic controller 231, 431 and 451 of said device while the communication unit of the device 64 is connected to the programmable logic controller 641 to read the data streams produced by this programmable logic controller.

In the example described, each of the communication units is a wireless communication unit able to transmit to the unit 7, according to a given communication protocol, the data streams produced by the programmable logic controller 231, 431, 451 and 641. The unit 7 is arranged to determine the communication protocol used to transmit a data frame that it receives and to extract data from said data frame that it receives based on said determined communication protocol. More precisely, the unit 7 converts a data frame that it receives into a standard format so as to be able to consolidate all of the data received from the various devices and facilitate the processing and the combination of these data.

The centralizing and processing unit 7 thus collects the data streams produced by the devices 23, 43, 45 and 64 of the hatchery 1 as well as the parameters measured by the sensors 26, 48 and 66. It is arranged to determine, from the data of these data streams that it collects, performance indicators of the hatchery 1.

In the remainder of the description, only three indicators will be described, it being understood that other indicators can be envisaged without departing from the scope of the present invention.

Figure 2:
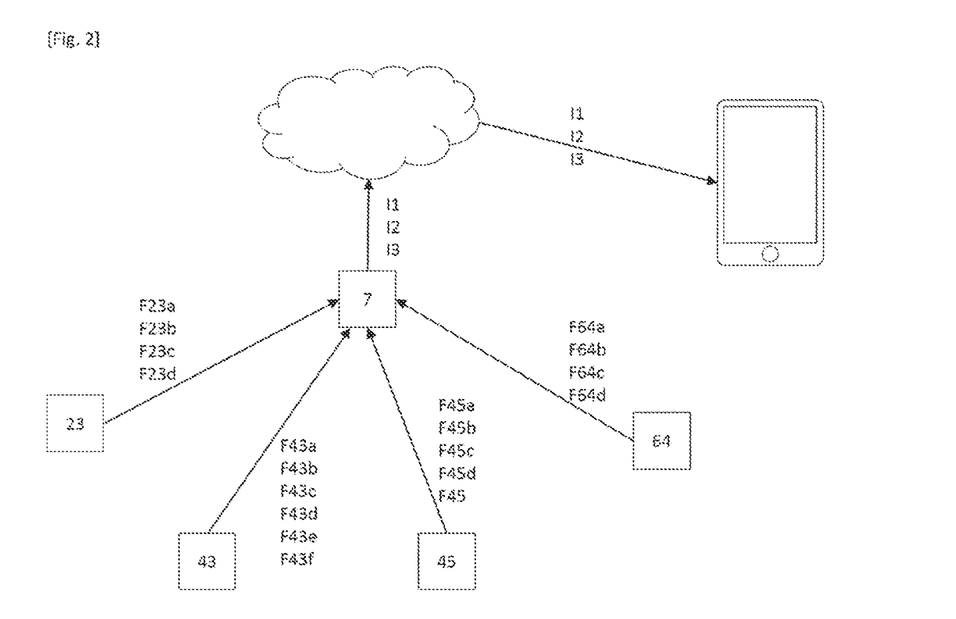
FIG. 2 represents, schematically and partially, an example of an interface of a software application connected to the connected hatchery of [FIG. 1]

As shown in [FIG. 2], the unit 7 will first determine a first indicator 11, from the data streams F23*b* and F23*a*. More precisely, the indicator 11 will be equal to the ratio of the last item of data of the flow F23*b* and the last item of data of the flow F23*a* to indicate the current percentage of upside-down eggs in the production line. This indicator will be updated by the unit 7 when a new item of data of the flow F23*a* and/or F23*b* is received.

The unit 7 also determines a second indicator 12, from the data streams F43*a* and F45*a*. More precisely, the indicator 12 will be equal to the ratio between the sum of all the last data of the streams F45*a* produced for different flocks over a given production period and the sum of all the last data of the streams F43*a* produced for different flocks over a given production period, in order to indicate the percentage of fertilized eggs vaccinated over that production period. This indicator 12 will be updated by the unit 7 when the passage of a new flock through the production line has been completed.

The unit 7 also determines a third indicator 13, from the data stream F64*b*. More precisely, the indicator 13 will be equal to the sum of all the last data of the streams F64*b* produced for different flocks over a given production period, in order to indicate the number of chicks exiting the production line over that production period. This indicator 13 will be updated by the unit 7 when the passage of a new flock through the production line has been completed.

Figure 3:
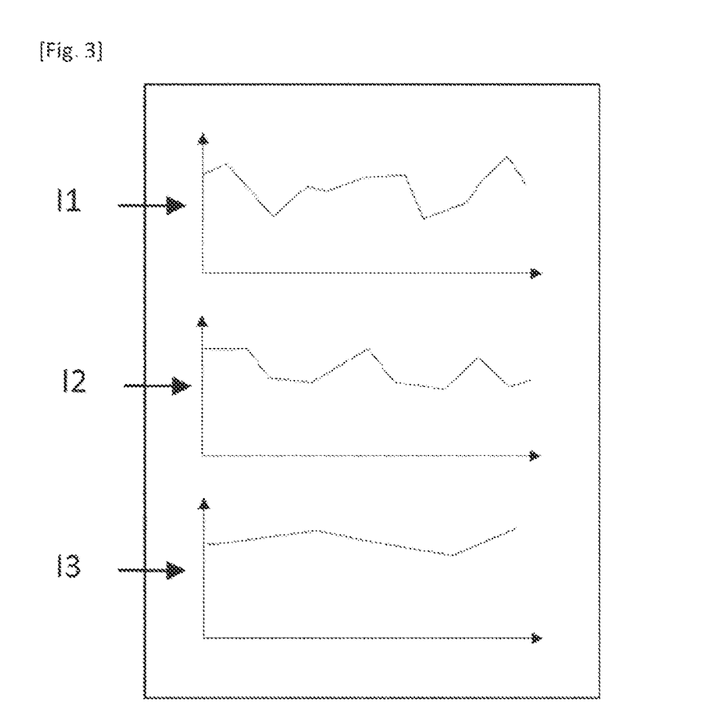
FIG. 3 represents, schematically and partially, data streams for each of the indicators.

Each of the indicators 11, 12 and 13, once determined or updated, is integrated into a data frame defined according to the MQTT (Message Queuing Telemetry Transport) protocol, and transmitted by a communication unit of the unit 7, via a telecommunication network, to a remote server 8. These indicators 11, 12 and 13 can then be downloaded by a software application installed on a smartphone 9, from which a supervisor of the production line can then monitor these indicators and trigger a corrective action if this proves necessary. FIG. 3 shows an example of an interface of this software application on which the indicators 11, 12 and 13 are shown.

In a variant not shown of the invention, each new data of the data streams F23*a* to F23*d*, F43*a* to F43*f*, F45*a* to F45*e* and F64*a* to F64*d* may be transmitted, without transformation, to the remote server, to be combined therein with other data so as to define more complex performance indicators or else to be directly accessible therefrom to the smartphone 9, the supervisor then being able to define indicators of their own choosing.

The foregoing description clearly explains how the invention makes it possible to achieve the objectives set out for it, namely to allow the monitoring of an entire bird farming production line, on the scale of a hatchery, both through raw data produced by the equipment and through correlations between various types of data generated by the same equipment or by different equipment.

In any case, the invention is not limited to the embodiments specifically described in this document, and extends in particular to any equivalent means and to any technically operative combination of these means.

What is claimed is:

1. A connected hatchery (1) comprising a plurality of devices (22, 23, 24, 25, 3, 42, 43, 44, 45, 46, 47, 5, 62, 63, 64) for handling, processing or vaccinating eggs or chicks distributed along a production line, each of the devices being an automated device fitted with a programmable logic controller (231, 431, 451, 641) capable of producing at least one data stream (F23*a*, F23*b*, F23*c*, F23*d*, F43*a*, F43*b*, F43*c*, F43*d*, F43*e*, F43*f*, F45*a*, F45*b*, F45*c*, F45*d*, F45*e*, F64*a*, F64*b*, F64*c*, F64*d*) relating to the performance or operations of the said automated device, characterized in that it comprises a data centralizing and processing unit (7) arranged to collect the data streams produced by the programmable logic controllers of said automated devices in order to determine at least one performance indicator (I1, I2, I3) of the production line from one or more of said collected data streams and in order to transmit said performance indicator over a telecommunications network to a remote terminal, wherein the centralizing and processing unit (7) is arranged to determine said at least one performance indicator (I1, I2, I3) of said production line by means of a combination of at least two items of data from one or more collected data streams (F23*a*, F23*b*, F43*a*, F45*a*, F64*b*).

2. The connected hatchery (1) according to claim 1, characterized in that each device for handling, processing or vaccinating eggs or chicks is a device selected from:
   a. A device (22, 42) for arranging eggs from a rack on a conveyor (21*a*, 41*a*);
   b. A device for assessing the size and/or weight of one or more eggs;
   c. A device (23) for detecting upside-down eggs, and marking said upside-down eggs;
   d. A device (24, 46) for filling a rack with eggs circulating on a conveyor;
   e. A device (25, 47) for stacking racks on a carriage;
   f. An egg incubator (3) or a hatchery (5);
   g. A device (43) for detecting eggs that are unfertilized or contain a dead embryo;
   h. A device for detecting the gender of the embryos in the egg;
   i. A device (44) for disinfecting eggs;
   j. A device (45) for vaccinating embryos in the eggs;
   k. A device for cleaning a rack;
   l. A device (62) for arranging chicks from a rack on a conveyor (61);
   m. A device (63) for vaccinating chicks by injection;
   n. A device for sorting chicks by gender;
   o. A counter (64) to count chicks moving on a conveyor;
   p. A device (65) for vaccinating chicks by spraying.

3. The connected hatchery (1) according to claim 1, wherein each device (22, 23, 24, 25, 3, 42, 43, 44, 45, 46, 47, 5, 62, 63, 64) for handling, processing or vaccinating eggs or chicks comprises a communication unit able to transmit to the centralizing and processing unit (7) said data stream (F23*a*, F23*b*, F23*c*, F23*d*, F43*a*, F43*b*, F43*c*, F43*d*, F43*e*, F43*f*, F45*a*, F45*b*, F45*c*, F45*d*, F45*e*, F64*a*, F64*b*, F64*c*, F64*d*) produced by the programmable logic controller (231, 431, 451, 641) of said device.

4. The connected hatchery (1) according to claim 1, wherein at least two communication units of two distinct devices (23, 43, 45, 64) are able to transmit data frames according to two distinct communications protocols and wherein the centralizing and processing unit (7) is arranged to determine the communication protocol used for the transmission of a data frame that it receives and to extract data from said data frame that it receives from said determined communication protocol.

5. The connected hatchery (1) according to claim 3, wherein the communication unit of at least one of the devices (23, 43, 45, 64) for handling, processing or vaccinating eggs or chicks is integrated into the programmable logic controller (231, 431, 451, 641) of said device.

6. The connected hatchery (1) according to claim 3, wherein the communication unit of at least one of the devices (23, 43, 45, 64) for handling, processing or vaccinating eggs or chicks is connected to the programmable logic controller (231, 431, 451, 641) of said device to read said data stream (F23a, F23b, F23c, F23d, F43a, F43b, F43c, F43d, F43e, F43f, F45a, F45b, F45c, F45d, F45e, F64a, F64b, F64c, F64d) produced by that programmable logic controller.

7. The connected hatchery (1) according to claim 3, wherein the programmable logic controller (231, 431, 451, 641) of each automated device (23, 43, 45, 64) is arranged to automatically produce at least one data stream (F23a, F23b, F23c, F23d, F43a, F43b, F43c, F43d, F43e, F43f, F45a, F45b, F45c, F45d, F45e, F64a, F64b, F64c, F64d) relating to the functioning or to the operations of said automated device, each datum of said data stream being generated automatically by the controller during the functioning or operations of said automated device.

8. The connected hatchery (1) according to claim 1, characterized in that it comprises at least one sensor (26, 46, 66) able to measure an environmental parameter of the hatchery, the data centralizing and processing unit (7) being arranged to collect the measurements of said environmental parameter acquired by said sensor.

9. The connected hatchery (1) according to claim 1, wherein the centralizing and processing unit (7) is arranged to update said performance indicator (I1, I2, I3) of said production line upon receipt of a new item of data and to transmit said updated performance indicator on said telecommunication network to said remote terminal.

\* \* \* \* \*